US007441995B2

(12) United States Patent
Sobota et al.

(10) Patent No.: US 7,441,995 B2
(45) Date of Patent: Oct. 28, 2008

(54) CAM-ACTUATED LOCKING INBOARD BARRIER

(75) Inventors: Elizabeth Sobota, Rochester, IN (US); Kenneth Thornburg, Culver, IN (US)

(73) Assignee: The Braun Corporation, Winamac, IN (US)

( * ) Notice: Subject to any disclaimer, the term of this patent is extended or adjusted under 35 U.S.C. 154(b) by 305 days.

(21) Appl. No.: 11/235,972

(22) Filed: Sep. 27, 2005

(65) Prior Publication Data

US 2007/0071569 A1 Mar. 29, 2007

(51) Int. Cl.
*B60P 7/08* (2006.01)

(52) U.S. Cl. .............................. 410/94; 410/7; 414/556; 414/921

(58) Field of Classification Search ..................... 410/3, 410/7, 94, 121; 414/540, 546, 556, 921; 224/42.33, 42.34; 248/351
See application file for complete search history.

(56) References Cited

U.S. PATENT DOCUMENTS

| | | | |
|---|---|---|---|
| 4,007,844 A | 2/1977 | Perkins | |
| RE31,157 E | 2/1983 | Perkins | |
| 4,664,584 A | 5/1987 | Braun et al. | |
| 4,725,185 A | 2/1988 | Neagu | |
| 4,806,062 A | 2/1989 | Stier | |
| 4,836,736 A | 6/1989 | Neagu | |
| 5,180,275 A | 1/1993 | Czech et al. | |
| 5,261,779 A | 11/1993 | Goodrich | |
| 5,277,275 A | 1/1994 | Ablabutyan | |
| 5,449,267 A | 9/1995 | Ablabutyan | |
| 5,605,431 A | 2/1997 | Saucier et al. | |
| 5,683,221 A | 11/1997 | Ablabutyan | |
| 5,806,632 A | 9/1998 | Budd et al. | |
| 6,065,924 A | 5/2000 | Budd et al. | |
| 6,077,025 A | 6/2000 | Budd et al. | |
| 6,183,187 B1 | 2/2001 | Ablabutyan | |
| 6,238,169 B1 | 5/2001 | Dupuy et al. | |
| 6,305,897 B1 | 10/2001 | Budd et al. | |
| 6,352,396 B1 | 3/2002 | Budd et al. | |
| 6,357,992 B1 | 3/2002 | Ringdahl et al. | |
| 6,398,479 B1 | 6/2002 | Dupuy et al. | |
| 6,461,097 B1 | 10/2002 | Ablabutyan et al. | |
| 6,464,447 B2 | 10/2002 | Dupuy et al. | |
| 6,599,079 B1 | 7/2003 | Hermanson et al. | |
| 6,692,217 B1 | 2/2004 | Pierrou | |
| 6,705,824 B2 | 3/2004 | Ablabutyan et al. | |
| 6,739,824 B2 | 5/2004 | Dupuy et al. | |
| 6,825,628 B2 | 11/2004 | Heigl | |
| 6,837,670 B2 | 1/2005 | Goodrich | |
| 6,860,701 B2 | 3/2005 | Kiser | |
| 6,948,903 B2 | 9/2005 | Ablabutyan et al. | |
| 7,108,466 B2 * | 9/2006 | Panzarella et al. | 410/7 |

* cited by examiner

*Primary Examiner*—Stephen Gordon
(74) *Attorney, Agent, or Firm*—Michael Best & Friedrich LLP

(57) ABSTRACT

A cam-actuated locking system for the inboard barrier of a wheelchair lift is provided. The lift includes a linkage system having a push arm and a slide block. The push arm includes a sliding member with a first keyhole, and a fixed member with a second keyhole. A lock mechanism is pivotally coupled to the sliding member, and includes a keyhole insert. The second keyhole of the fixed member cooperates with the first keyhole and the lock mechanism so that when the keyhole insert of the lock mechanism inserts into the aligned keyholes of the fixed and sliding members, the inboard barrier is locked in a barrier position.

18 Claims, 9 Drawing Sheets

CAM-ACTUATED LOCKING INBOARD BARRIER

FIELD OF THE INVENTION

This invention relates generally to a wheelchair lift. More particularly, the invention relates to a wheelchair lift having a locking inboard barrier.

BACKGROUND

Parallelogram-type and other types of wheelchair lifts are well known and include an outboard barrier (i.e., rollstop) for preventing a wheelchair occupant from accidentally falling from the lift platform, particularly when it is raised above ground elevation. Similarly, many lifts also include an inboard barrier which additionally prevents the wheelchair and occupant from inadvertently rolling or sliding off the inboard edge (vehicle side) of the platform and becoming trapped between the lift platform and the vehicle structure.

Such lifts employ various mechanisms to cause the inboard and outboard barriers to move in an automatic or otherwise coordinated manner relative or in response to the platform state (e.g., raising, lowering, etc.) or position. One example of a mechanism for actuating the inboard barrier is the cam actuated cable system of U.S. Pat. No. 5,605,431 to Saucier et al. This system employs a bell crank and cable wherein the lifting parallelogram actuates a cable, the length of which is controlled by a cam assembly pivoted to the lifting end link of an arm of the parallelogram. As the platform moves, the inboard barrier is raised or lowered by the other end of the cable.

Wheelchair lifts have also employed a system or assembly of linkage members, such as arms, to move and synchronize the inboard barrier relative to the lift platform elevation. One such wheelchair lift is disclosed in U.S. Pat. No. 6,238,169 to Dupuy et al. for "Dual Function Inboard Barrier/Bridgeplate Assembly For Wheelchair Lifts", issued May 29, 2001 to applicant's assignee which is incorporated by reference herein in its entirety. The disclosed lift has a stowable platform and a dual-function safety barrier pivotably coupled thereto. The barrier is actuated by a linkage system for movement between a raised safety position and a lowered bridging position in synchronism with the elevation of the platform. The lift employs a linkage system having a slide block for pivoting the platform from the horizontal transfer position to a generally vertical stowed position. In operation, the slide block of the linkage system contacts the lower parallelogram arm during platform lifting so that a push arm of the linkage system is moved downwardly. A link, which couples the push arm to the barrier, pivots to rotate the barrier from a raised position to a substantially horizontal position to act as a bridge plate at the transfer level.

While the barrier-actuating link is particularly adept at positioning the inboard barrier, a need may also exist to ensure that the inboard barrier is retained in a desired position, particularly in its raised position. To that end, National Highway Traffic Safety Administration (NHTSA) rules require a lift interlock to inhibit raising and lowering of the lift platform unless the inboard barrier is properly positioned. Moreover, NHTSA requires that the inboard barrier be substantially rigid to prevent a wheelchair and/or wheelchair occupant on the lift platform from contacting any other structure (e.g., the vehicle).

Therefore, in view of the foregoing, it is desirable to lock the inboard barrier in a generally vertical position so that the inboard barrier poses a substantially rigid obstacle, and so that operation of the lift is not interrupted due to momentary and/or accidental contact with the inboard barrier.

BRIEF SUMMARY

In some aspects, a cam-actuated locking inboard barrier system for a wheelchair lift is provided. The wheelchair lift includes a linkage system having a push arm and a slide block. In one embodiment, the push arm includes a sliding member and a fixed member, wherein the members are coupled together. In various alternative embodiments, the push arm may be telescoping, rigid, or other known configurations. The fixed member of the push arm includes a keyhole, and the sliding member includes another keyhole proximate a first bracket. An inboard barrier lock mechanism is pivotally coupled to the first bracket and is spring biased for engagement with the keyholes. When the members are in a predetermined position relative to each other, the keyholes are aligned and engaged by the lock mechanism, thereby locking the members together. Concurrently, the inboard barrier, which is coupled to the push arm by an actuator link, is locked.

Between ground level and a predetermined intermediate platform elevation prior to transfer level, the keyholes are aligned so a keyhole insert may engage the keyholes, thereby locking the inboard barrier in a substantially vertical position. At the predetermined intermediate platform elevation, the slide block contacts the underside of the parallelogram lower arm and rotates. As the slide block rotates, a portion of the slide block cams the lock mechanism to unlock the inboard barrier. The slide block continues to rotate, further camming the lock mechanism to slide the sliding member relative to the fixed member, thereby simultaneously pivoting the inboard barrier to a horizontal bridging position.

In other aspects, an inboard barrier system for a wheelchair lift is provided and the wheelchair lift includes a platform for supporting a wheelchair and the inboard barrier system includes an inboard barrier plate coupled to the platform at or adjacent an inboard end of the platform and moveable between a first position and a second position, an arm including a first member and a second member moveable relative to the first member, the arm being coupled to the inboard barrier plate for moving the inboard barrier plate between the first and second positions, and a lock mechanism moveably coupled to the arm and engageable with at least one of the first and second members of the arm to prevent movement of the second member relative to the first member.

In further aspects, an inboard barrier system for a wheelchair lift is provided and the wheelchair lift includes a platform for supporting a wheelchair and the inboard barrier system includes an inboard barrier plate coupled to the platform at or adjacent an inboard end of the platform and moveable between a first position and a second position, an arm including a first member and a second member moveable relative to the first member, the arm being coupled to the inboard barrier plate for moving the inboard barrier plate between the first and second positions, and a lock mechanism coupled to the arm and moveable between a locking position, in which the lock mechanism engages at least one of the first and second members of the arm to prevent movement of the second member relative to the first member, and an unlocked position, in which the lock mechanism is out of engagement with the at least one of the first and second members of the arm to, allow movement of the second member relative to the first member, the lock mechanism including a biasing member to bias the lock mechanism toward the locking position.

In yet other aspects, an inboard barrier system for a wheelchair lift is provided and the wheelchair lift includes a platform for supporting a wheelchair and a lifting mechanism for moving the platform between a ground level position and a transfer level position, and the inboard barrier system includes an inboard barrier plate coupled to the platform and moveable between a first position and a second position, an actuator coupled to the inboard barrier plate to move the inboard barrier plate between the first and second positions, and a lock mechanism moveable relative to the actuator to lock the inboard barrier plate in the second position as the platform moves between the ground level position and the transfer level position, wherein the lifting mechanism causes the lock mechanism to unlock the inboard barrier plate from the second position.

DETAILED DESCRIPTION

The following detailed description illustrates the invention by way of example, not by way of limitation of the principles of the invention. In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings omit parts that are not essential in that drawing to a description of a particular feature, aspect or principle of the invention being disclosed. Further, the vehicles to which the invention relates may be right, left or center drive. While the orientation herein is described by way of example with respect to a left-hand drive, the lift may be mounted in a right-hand drive vehicle, but it is not necessary to convert the parts to their mirror image, although that may be done so easily if desired.

Many of the components and subassemblies of the inboard barrier assembly and of a typical parallelogram-type or other type of wheel chair lift shown in the following figures are preferably disposed substantially symmetrically about a vertical plane of symmetry. This plane is referred to herein as the “centerline” (C/L) of the wheelchair lift. For simplicity and clarity, corresponding parts or elements on each side of the centerline may be referred to by the same label numbers with the label for one side distinguished by a prime symbol.

Figure 1:
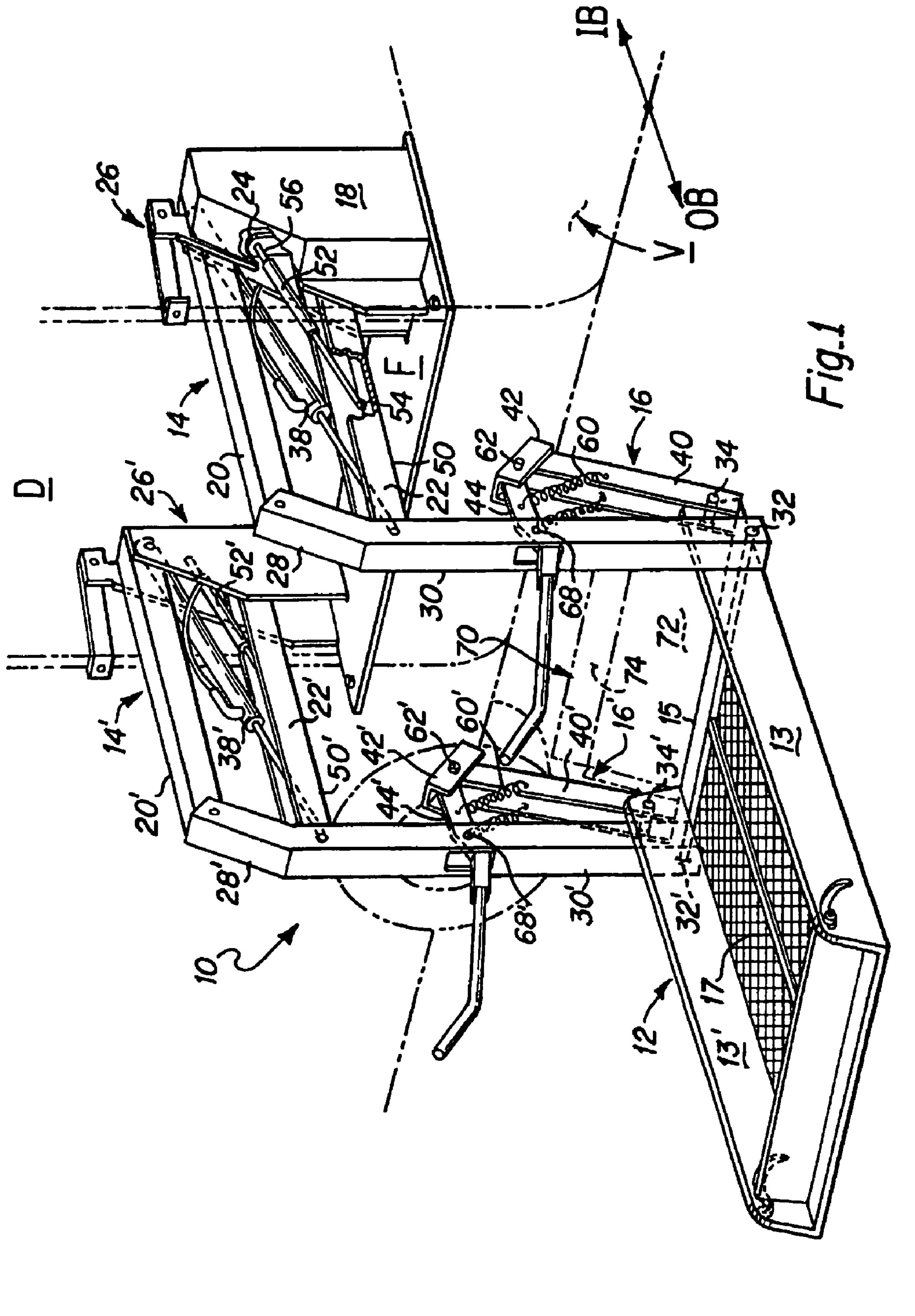
FIG. 1 illustrates in perspective a first general arrangement of a wheelchair lift for use with the cam-actuated locking inboard barrier system.
Figure 2:
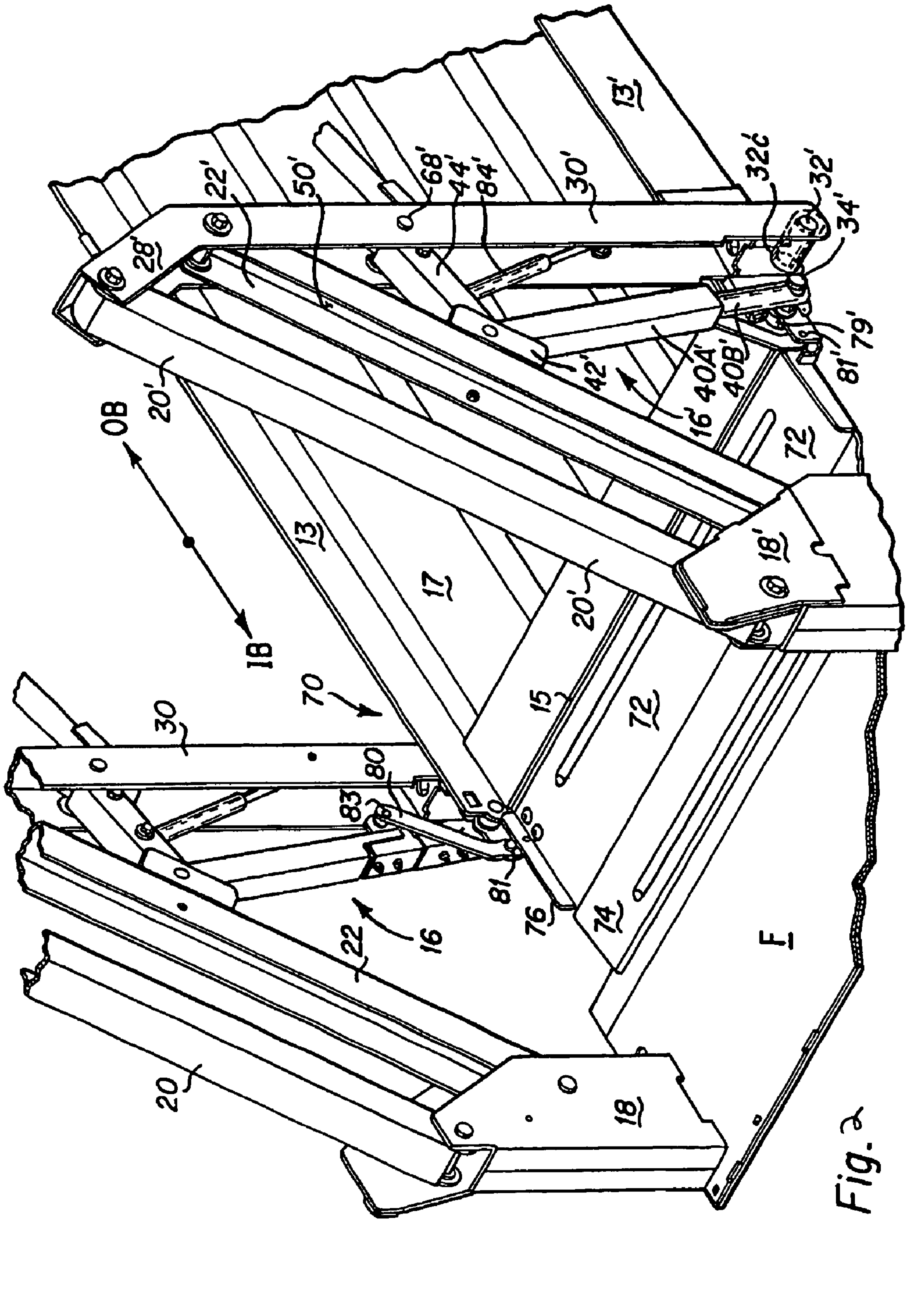
FIG. 2 illustrates in perspective a second general arrangement of a wheelchair lift for use with the cam-actuated locking inboard barrier system.

FIG. 1 is an isometric view that shows the general arrangement of a typical vehicle-mounted parallelogram-type wheelchair lift 10 with the platform assembly 12 at ground level. The lift 10 is mounted adjacent right-hand side door D and vehicle floor F with adjacent portions of the vehicle V shown as phantom lines. Note that the inboard/outboard orientation is indicated by arrows IB/OB, with the inboard direction being towards the upper right comer. This is a wheelchair lift of the type upon which the cam-actuated locking inboard barrier system may be installed and employed. However, other types of wheelchair lifts may incorporate the cam-actuated locking inboard barrier system. Another exemplary lift is illustrated in FIG. 2. One will notice that certain details of the various exemplary lifts which may incorporate the cam-actuated locking inboard barrier may differ, particularly with respect to the linkage system 16, 16'. As shown in FIG. 1, the linkage system 16 includes a spring 60 coupling the brace arm 44 to the push arm 40. Referring now to FIG. 2, the linkage system 16 includes a telescoping push arm 40 having an upper member 40A and a lower member 40B, a brace arm 44, and a gas spring 84 biasing the two arms 40, 44 to a desired angle about pivot 62 (FIG. 1). The cam-actuated locking inboard barrier system may be adapted to the exemplary illustrated lifts, or other lifts having various linkage systems having a push arm.

As seen in FIG. 1, the parallelogram lift 10 comprises platform assembly 12, paired parallelogram arm lifting assemblies 14, 14', linkage systems 16, 16', and hydraulic pump/control assembly 18 as mounted in vehicle V, for example in a side door opening. The parallelogram lifting assemblies 14, 14' comprise top links 20, 20', bottom links 22, 22', rear links 24, 24' (located but not visible in or as part of the stanchions 26, 26'), and front links 28, 28'. The front link lower extensions 30, 30' are the lifting arms to which the platform assembly 12 is pivoted at 32 adjacent the inboard end, but outwardly of the inboard end a distance sufficient to provide a lever arm by the spacing between pivot rod 32 and the articulated lever arm lower pivot 34, 34'. The lower arm pivot 34, 34' is located adjacent the inboard end of platform side flanges 13, 13'. A bridge plate mounted in the interior of the vehicle is not needed with lift 10, as the inboard barrier assembly 70 rotates to form a bridging structure between the platform 12 and the vehicle floor F as the lift reaches the transfer level. The platform lifting hydraulic cylinders are 38, 38'.

Figure 7A:
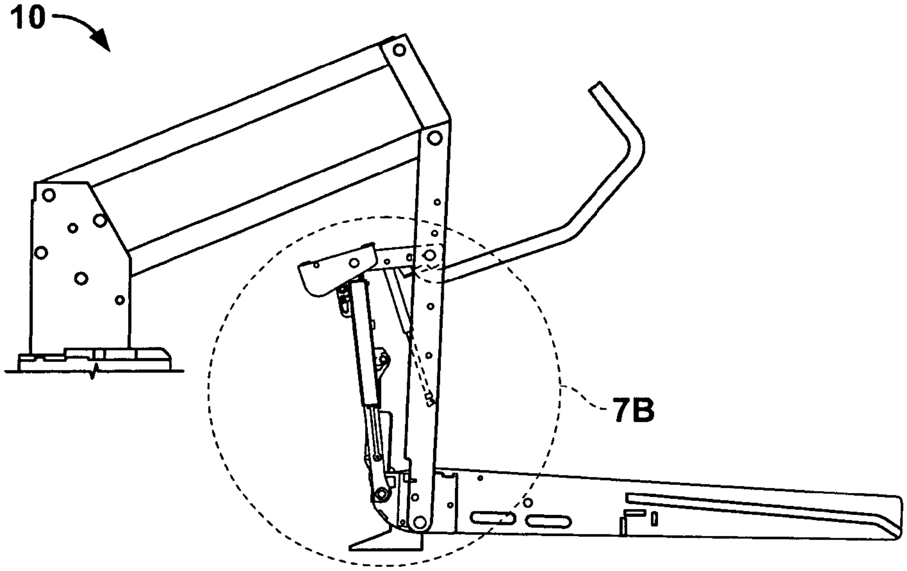
FIGS. 7A-B illustrate a side view of the cam-actuated locking inboard barrier system in a locked position.
Figure 7B:
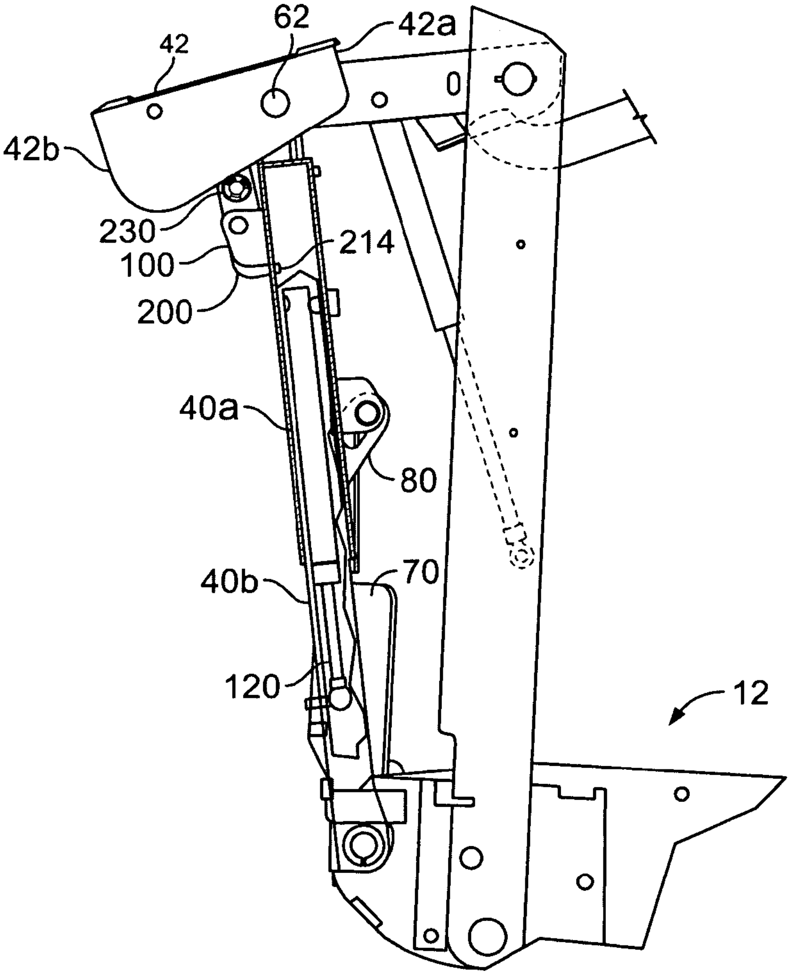

Referring now to FIGS. 7 and 8, the cam-actuated locking inboard barrier system is described in detail with another exemplary wheelchair lift. As illustrated in FIGS. 7A, 7B, 8A, 8B, 8C, 8D, and particularly 7B and 8B, the linkage system 16 comprises a push arm 40 having a sliding member 40A and a fixed member 40B, and a pivoting slide block 42. Referring now to FIGS. 4A-4D, the sliding member 40A is a square tube having a lock bracket 100 proximate a first keyhole 102. Although the sliding member 40A is illustrated as a square tube, the sliding member 40A may be shaped otherwise (e.g., round, rectangular, triangular, etc.) to correspond to and cooperate with fixed member 40B. The lock bracket 100 is welded or otherwise permanently affixed to the outside of the sliding member 40A and includes holes 104 drilled or otherwise formed to accept a fastener such as a pin, bolt, screw, rivet, or the like. As shown in FIGS. 8C and 8D, and discussed in further detail below, a lock mechanism 200 is connected to the lock bracket 100 by the fastener. A lower bracket 106 is similarly welded or otherwise permanently affixed to the outside of the square tube and positioned opposite the lock bracket 100 (see FIGS. 4B and 4D). Similar to the lock bracket 100, the lower bracket 106 includes a hole 108 for pivotally coupling the inboard barrier 70 to the linkage system 16 via a barrier-actuating link 80 as best seen in FIG. 2 and FIG. 8B.

Figure 5A:
FIGS. 5A-C illustrate the fixed member of the push arm.
Figure 5B:
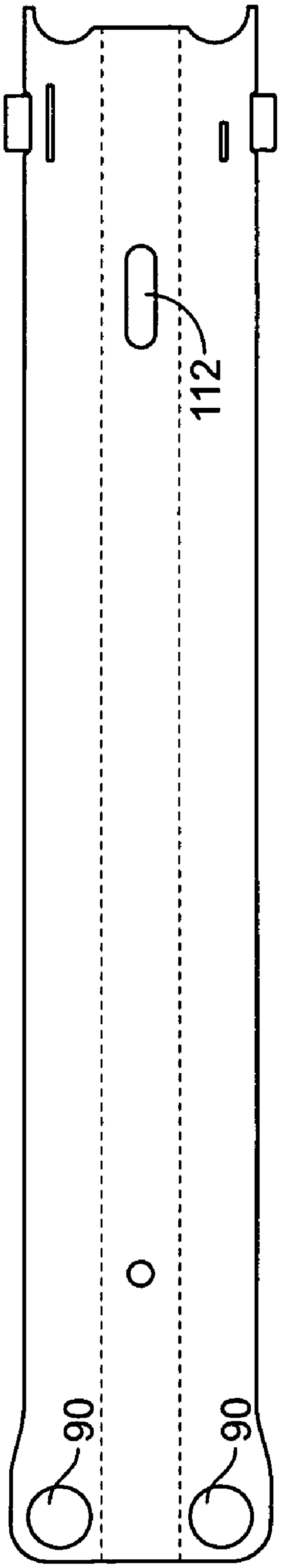
Figure 5C:
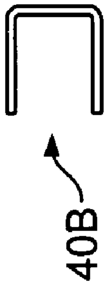
Figure 8A:
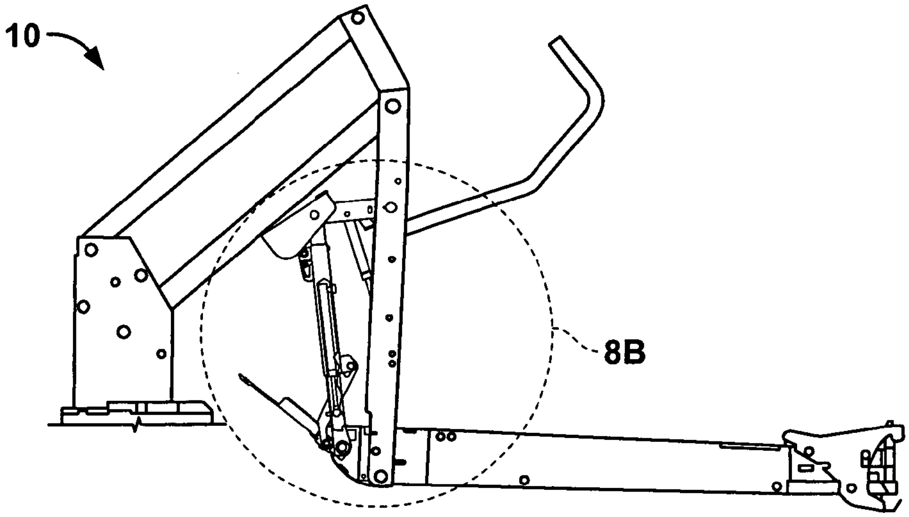
FIGS. 8A-D illustrate the cam-actuated locking inboard barrier system in an unlocked position.
Figure 8C:
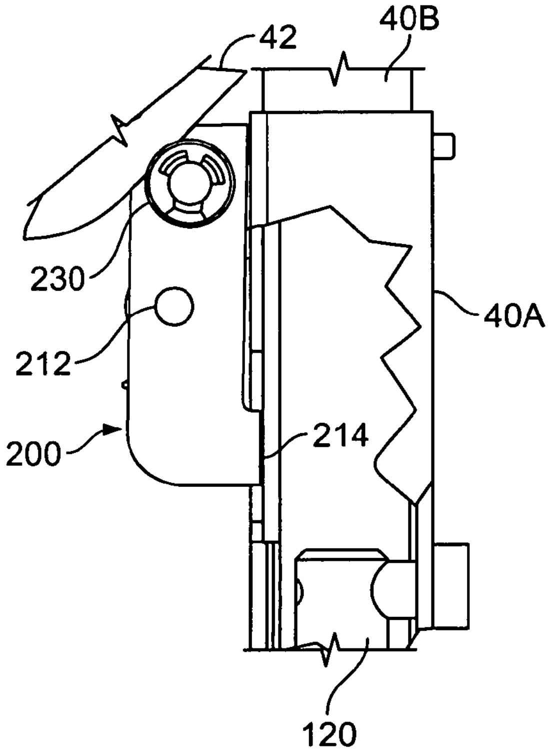
Figure 8D:
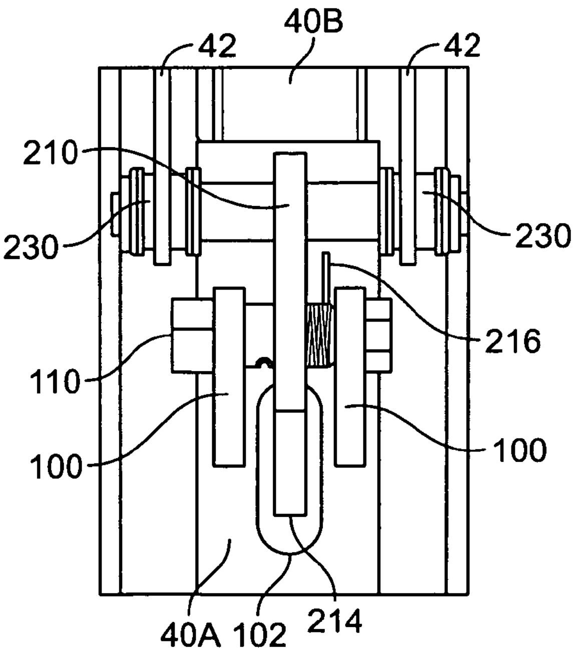
Figure 8B:
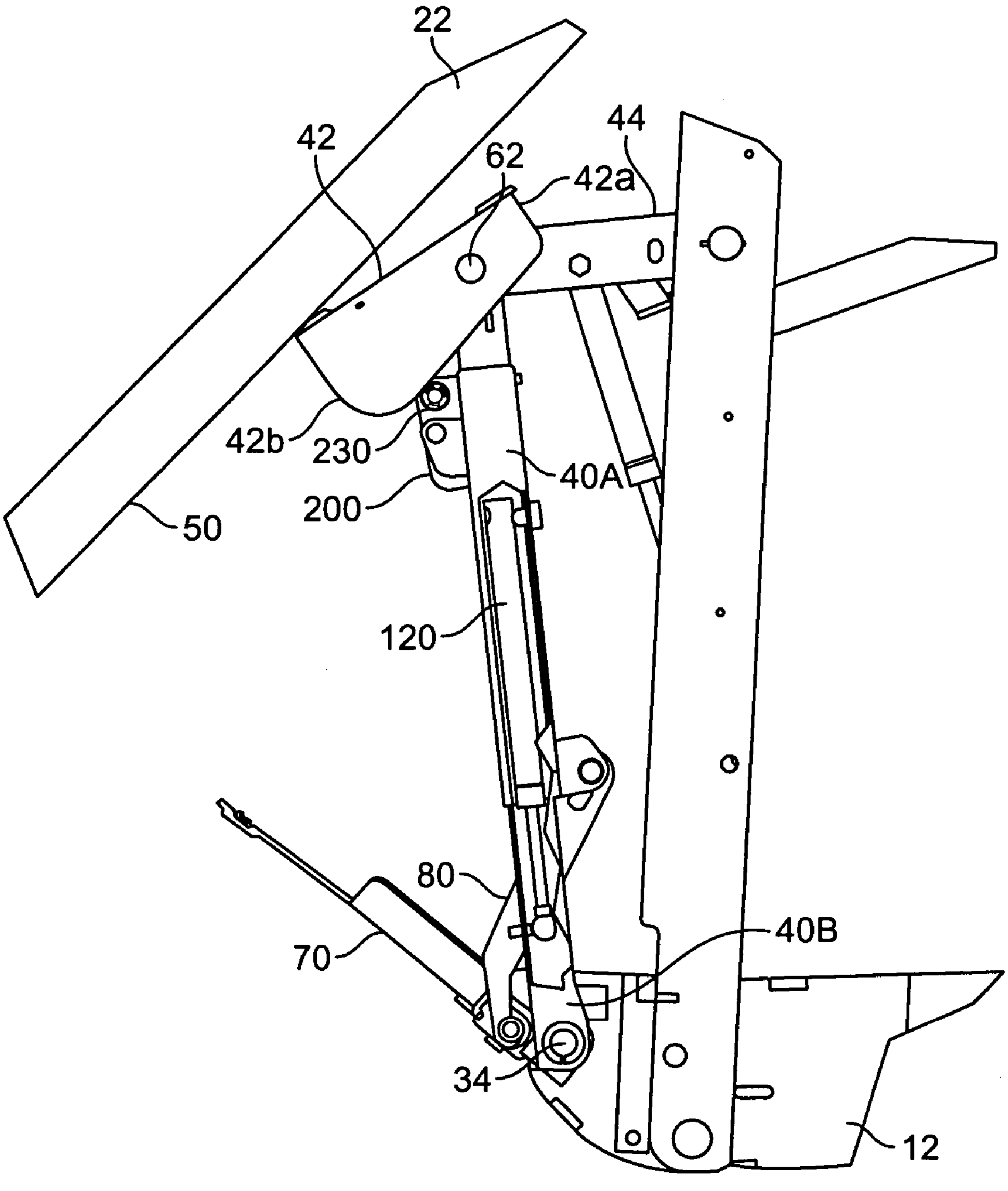

Referring to FIGS. 5A-5C, the fixed member 40B is described. As illustrated, the fixed member 40B is sized and shaped so that the sliding member 40A may slide freely up and down thereon. The fixed member 40B is an elongate channel member (see FIG. 5C) having a second keyhole 112 and a pair of pivot holes 90 for attaching the linkage system 16 to the platform 12 at pivot 34. As shown in FIGS. 7B and 8B, the members 40A, 40B are coupled together by a gas spring 120. One exemplary gas spring is model number 16-2-172-100-B38-600N manufactured by SUSPA Inc., however, other suitable springs, gas springs or shocks, or other elastomeric members may be used. As illustrated in FIG. 7B, the gas spring 120 normally biases the sliding member 40A to an upward position on fixed member 40B. As shown, the tube end of the gas spring 120 is connected to the sliding member 40A, and the rod end is connected to the fixed member 40B. When the sliding member 40A is positioned, forced, or biased fully upward on fixed member 40B by the gas spring 120, the second keyhole 112 of the fixed member 40B is aligned with the first keyhole 102 of the sliding member 40A.

Figure 3A:
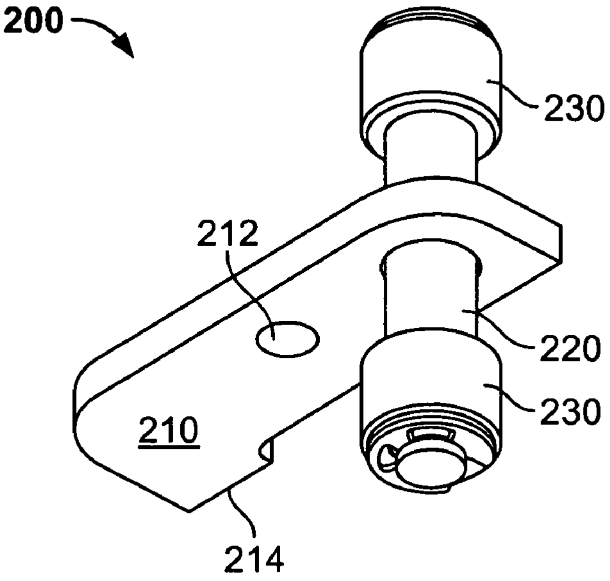
FIGS. 3A-C illustrate the inboard barrier lock mechanism.
Figure 3B:
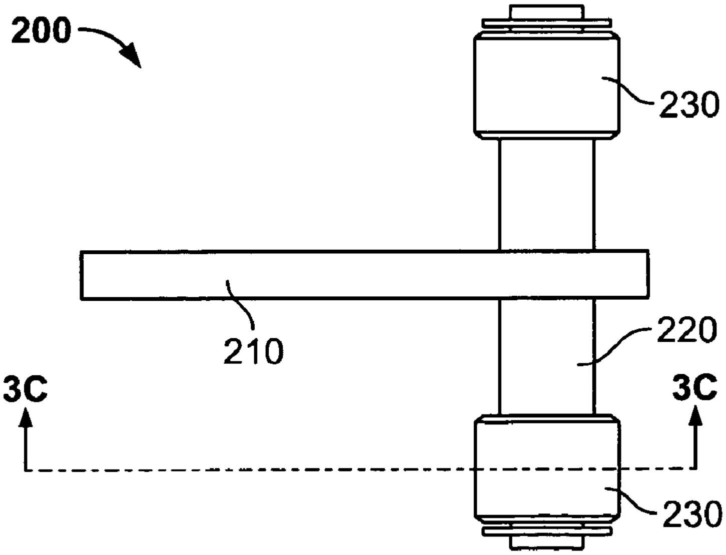
Figure 3C:
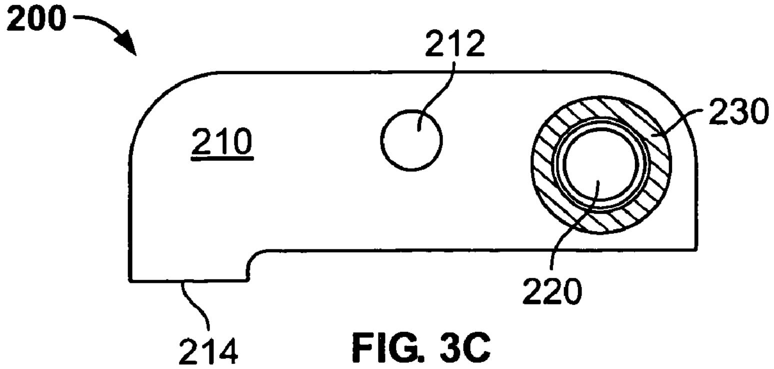
Figure 4D:
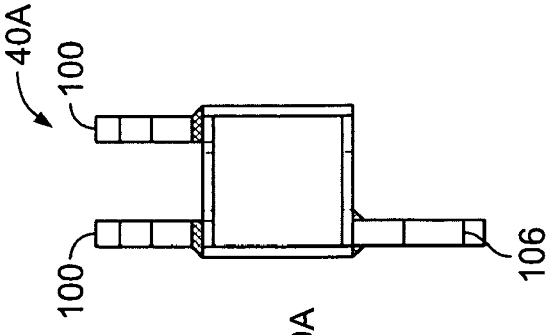
FIGS. 4A-D illustrate the sliding member of the push arm.
Figure 4A:
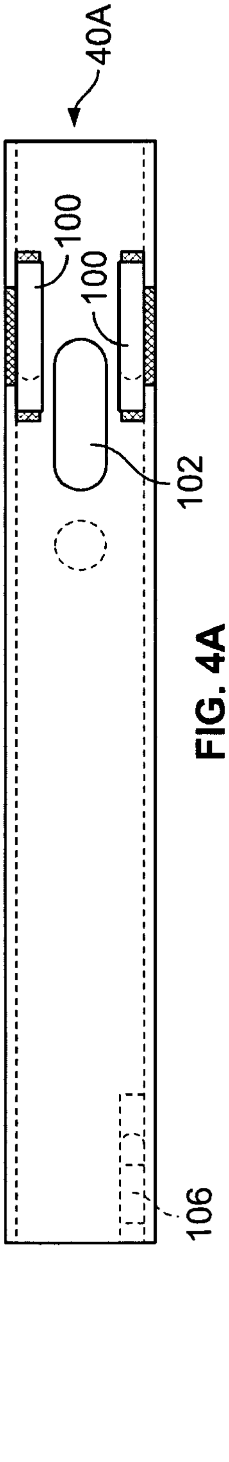
Figure 4B:
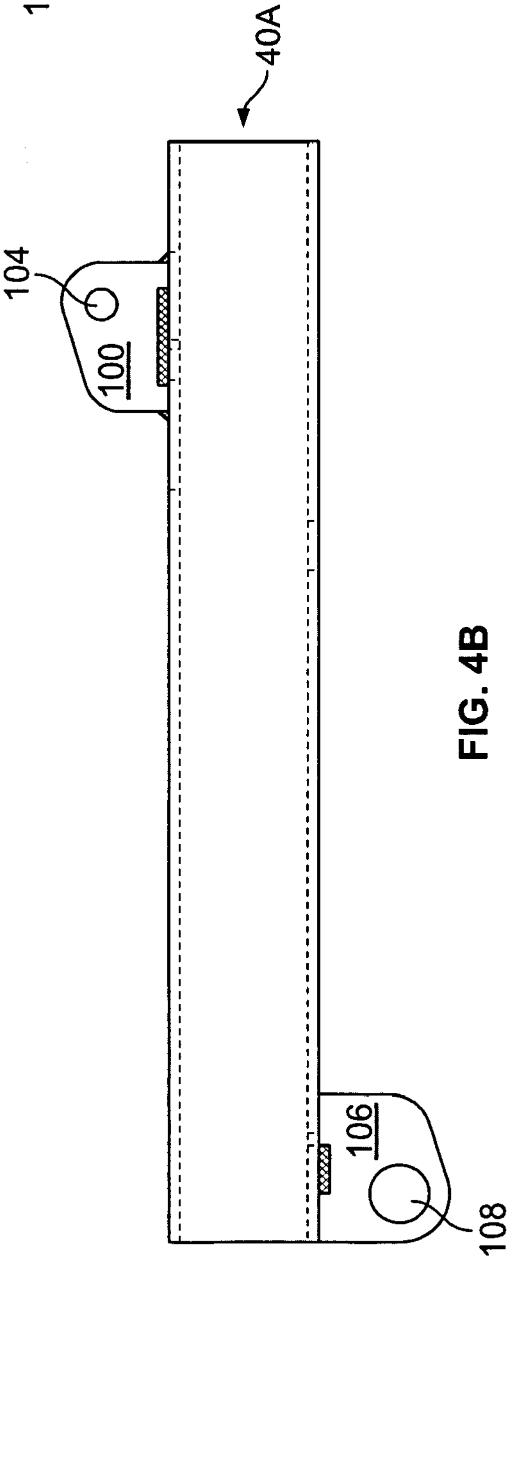
Figure 4C:
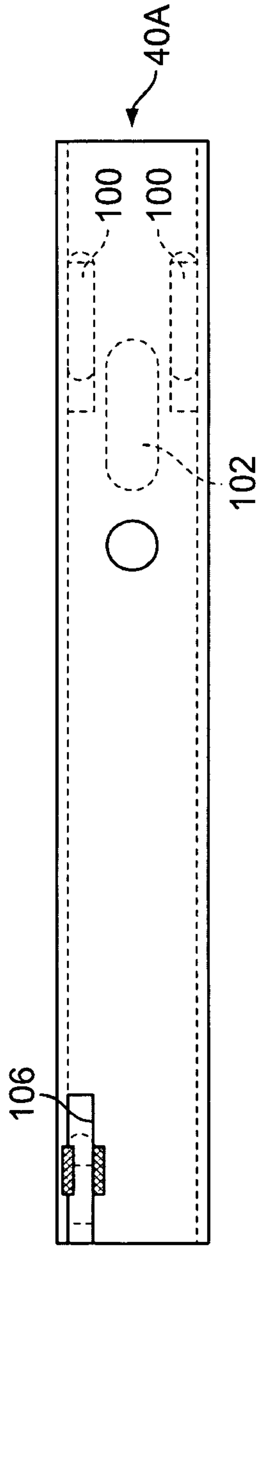

Referring now to FIGS. 3A-3C, the lock mechanism 200 is described in further detail. The lock mechanism 200 includes a planar lock member 210 coupled to a transverse shaft 220 having cam followers 230. The lock member 210 includes a pivot hole 212 intermediate the shaft 220 and a keyhole insert 214. The lock member 210 is connected to the upper bracket 100 such that holes 104 and pivot hole 212 are aligned. As best seen in FIG. 8D, a fastener 110 is inserted through the holes 104, 212 to pivotally connect the lock mechanism 200 to the sliding member 40A. Additionally, a spring 216 such as a torsion spring is disposed on the fastener 110 to bias the keyhole insert 214 toward the sleeve member 40A and first keyhole 102. The cam followers 230 are located on the ends of shaft 220 and are spaced apart a distance corresponding to the width W of slide block 42 (FIG. 6B, 8D). Furthermore, the shaft 220 and/or the cam followers 230 may be fixed or free relative to the lock member 210. In the illustrated embodiment, cam followers 230 rotate on the shaft 220, and the shaft 220 is fixed relative to the lock member 210.

Figure 6A:
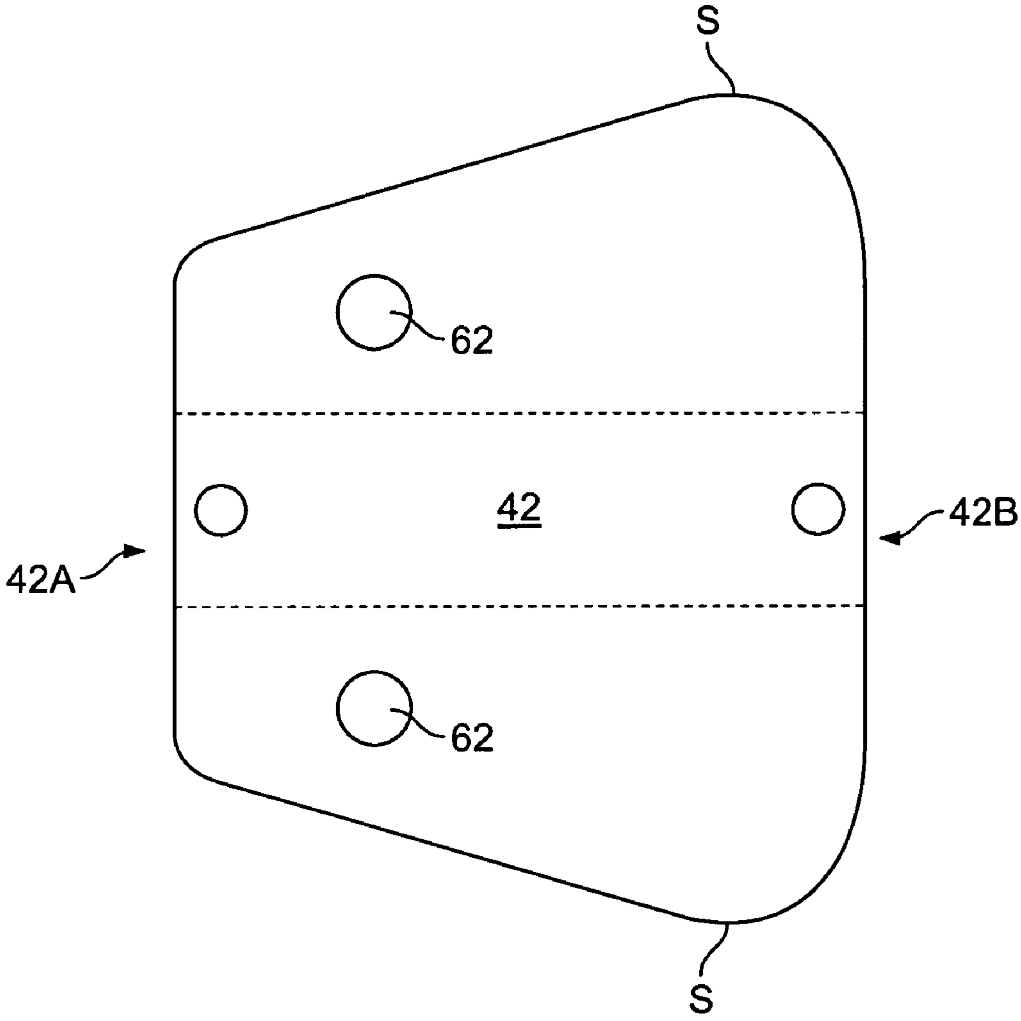
FIGS. 6A-B illustrate the sliding block.
Figure 6B:
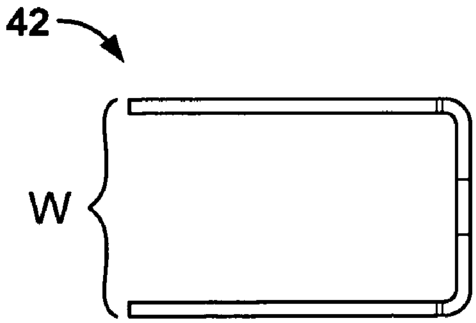

Referring now to FIGS. 6A-6B, the illustrated slide block 42 includes a pivot end 42*a* and a free, camming end 42*b*. As shown in FIGS. 7B and 8B, the exemplary slide block 42 is pivotally connected to the push arm 40 of the linkage system 16 at pivot 62. As the lift is raised, the slide block 42 approaches and makes contact with the underside 50 of lower parallelogram link 22 (FIG. 8B). FIGS. 8A and 8B show the lift and overall arrangement of components at the point that this contact has just occurred, at a position somewhat below the transfer level. At this point, the slide block 42 is pivoted downwardly by the lower parallelogram link 22 and rotates to contact the cam followers 230. By comparing FIGS. 7A and 7B to FIGS. 8A and 8B, one sees that the cam followers 230 are urged forward (toward the push arm 40) by the slide block 42, thereby pivoting the keyhole insert 214 out of the keyholes 102, 112 (FIGS. 5B, 8D), unlocking the sliding member 40A from the fixed member 40B so that the sliding member 40A may now slide on fixed member 40B (FIG. 8B).

As platform lifting progresses, slide block 42 pivots further in contact with the lower link 22. The cam followers 230 are further cammed and forced downward by the slide block 42 camming end 42*b*, thereby progressively forcing sliding member 40A downward on fixed member 40B, which in turn causes actuator link 80 to rotate inboard barrier plate 72 towards a generally horizontal bridging position. As shown in the figures, and particularly FIG. 6B, the slide block 42 camming end 42*b* has a shoulder S. As the platform 12 reaches the transfer level, continued rotation of the slide block 42 drives the cam followers 230 downward further as they travel around the shoulder S. Finally, sliding member 40A reaches its lowest position as the cam followers 230 arrive at a resting position on the planar portion of the camming end 42*b*. At this lowest position, the inboard barrier 70 is retained in its bridging position by the slide block 42.

When the platform 12 is lowered from the transfer level, rotation of the slide block 42 is reversed, thereby disengaging the camming end 42*b* from the cam followers 230, which in turn permits the gas spring 120 to force the sliding member 40A upward on fixed member 40B. Nearly simultaneously, the inboard barrier actuating link 80 pivots to allow barrier plate 72 to rotate upwards towards a substantially vertical barrier position. The camming end 42*b* releases the lock mechanism 200 so that the spring 216 urges the keyhole insert 214 toward the arm 40. As the sliding member 40A approaches its upward position on fixed member 40B, the first keyhole 102 aligns with the second keyhole 112 and the keyhole insert 214 engages the keyholes 102, 112 to rigidly lock the inboard barrier 70 upright.

The illustrated components of FIGS. 3-6 may be adapted for use with other lifts, such as those having telescoping push arms. For example, by positioning keyholes on the upper and lower members 40A, 40B of the telescoping push arm 40 of FIG. 2, the telescoping push arm 40 may be locked in a desired position such that the inboard barrier 72 is vertical. The sliding block 42 may be sized and shaped to cam a lock mechanism proximate the telescoping push arm keyholes. Alternatively, the linkage assembly 16 may include a lock-actuating link between the lock mechanism and another component of the lift, such as the sliding block 42 or brace arm 44. In other embodiments, the push arm 40 may be rigid (FIG. 1). The lock mechanism may lock the push arm 40 to another component of the lift such as the lifting arm 30 so that the barrier-actuating link 80 is retained in a position such that the inboard barrier 72 is vertical.

All references, including publications, patent applications, and patents, cited herein are hereby incorporated by reference to the same extent as if each reference were individually and specifically indicated to be incorporated by reference and were set forth in its entirety herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An inboard barrier system for a wheelchair lift, the-wheelchair lift including a platform for supporting a wheelchair, the inboard barrier system comprising:

an inboard barrier plate coupled to the platform at or adjacent an inboard end of the platform and moveable between a first position and a second position;

an arm including a first member and a second member moveable relative to the first member, the arm being coupled to the inboard barrier plate for moving the inboard barrier plate between the first and second positions;

a lock mechanism moveably coupled to the arm and engageable with at least one of the first and second members of the arm to prevent movement of the second member relative to the first member, the lock mechanism including a cam follower; and a slide block pivotably coupled to the arm and engageable with the cam follower to move the lock mechanism out of engagement with the at least one of the first and second members.

2. The system of claim 1, wherein the inboard barrier plate is pivotablebetween the first position and the second position, the inboard barrier plate being substantially horizontal in the first position and substantially vertical in the second position.

3. The system of claim 1, wherein the first member of the arm is fixedand the second member of the arm is slideable along the first fixed member.

4. The system of claim 1, wherein the second member is coupled to theinboard barrier plate.

5. The system of claim 1, wherein the lock mechanism is pivotallycoupled to the second member and is engageable with the first member to prevent movement ofthe second member relative to the first member.

6. The system of claim 1, wherein the lock mechanism is pivotallycoupled to the second member of the arm and pivotable between a locking position, in which thelock mechanism engages the first member to prevent movement of the second member relative to the first member, and an unlocked position, in which the lock mechanism disengages from the first member and the second member is moveable relative to the first member, the lock mechanism including a biasing member for biasing the lock mechanism toward the locking position.

7. The system of claim 6, wherein the slideblock engagesthe lock mechanism for moving the lock mechanismfrom the locking position to the unlocked position.

8. The system of claim 1, wherein the first member includes a firstkeyhole and the second member includes a second keyhole, the first and second keyholes beingalignable and the lock mechanism adapted to be inserted into the first and second keyholes whenthey are aligned.

9. The system of claim 1, wherein the cam follower includes a pair of cam followers, and wherein the slideblock is engageable with the pair of cam followers to move the lock mechanism out of engagement with the at least one of the first and second members.

10. An inboard barrier system for a wheelchair lift, the wheelchair liftincluding a platform for supporting a wheelchair, the inboard barrier system comprising:

an inboard barrier plate coupled to the platform at or adjacent an inboard end of the platform and moveable between a first position and a second position;

an arm including a first member and a second member moveable relative to the first member, the arm being coupled to the inboard barrier plate for moving the inboard barrier plate between the first and second positions; and a lock mechanism coupled to the arm and moveable between a locking position, in which the lock mechanism engages at least one of the first and second members of the arm to prevent movement of the second member relative to the first member, and an unlocked position,in which the lock mechanism is out of engagement with the at least one of the first and secondmembers of the arm to allow movement of the second member relative to the first member, thelock mechanism including a biasing member to bias the lock mechanism toward the locking position.

11. The system of claim 10, wherein the inboard barrier plate is pivotable between the first position and the second position, the inboard barrier plate being substantially horizontal in the first position and substantially vertical in the second position.

12. The system of claim 10, wherein the first member of the arm is fixed and the second member of the arm is slideable along the first fixed member.

13. The system of claim 10, wherein the second member is coupled to theinboard barrier plate.

14. The system of claim 10, wherein the lock mechanism is pivotally coupled to the second member and is engageable with the first member to prevent movement ofthe second member relative to the first member.

15. The system of claim 10, further comprising a slide block pivotally coupled to the arm, the slide block engaging the lock mechanism for moving the lock mechanism from the locking position to the unlocked position.

16. The system of claim 10, wherein the first member has a first keyholeand the second member includes a second keyhole, the first and second keyholes being alignable and the lock mechanism adapted to be inserted into the first and second keyholes when they are aligned.

17. The system of claim 10, wherein the lock mechanism includes a camfollower, the system further comprising a slide block pivotably coupled to the arm and engageable with the cam follower to move the lock mechanism toward the unlocked position.

18. The system of claim 10, wherein the lock mechanism includes a pairof cam followers, the system further comprising a slide block pivotably coupled to the arm and engageable with the pair of cam followers to move the lock mechanism toward the unlocked position.

* * * * *